(12) United States Patent
Holm et al.

(10) Patent No.: US 8,156,447 B2
(45) Date of Patent: Apr. 10, 2012

(54) CONTACT SHEET GENERATOR (75) Inventors: Aaron H. Holm, Brooklyn, NY (US); Steven P. Kalalian, New York, NY (US)

(73) Assignee: Industrial Color, Inc., New York, NY (US)

( * ) Notice: Subject to any disclaimer, the term of this patent is extended or adjusted under 35 U.S.C. 154(b) by 837 days.

(21) Appl. No.: 12/052,484

(22) Filed: Mar. 20, 2008

(65) Prior Publication Data

US 2008/0235625 A1    Sep. 25, 2008

Related U.S. Application Data (60) Provisional application No. 60/896,186, filed on Mar. 21, 2007.

(51) Int. Cl.
*G06F 3/048* (2006.01)
*G06F 17/00* (2006.01)
*G06K 9/32* (2006.01)
*G06K 9/36* (2006.01)

(52) U.S. Cl. ........ 715/835; 715/764; 715/838; 715/212; 715/217; 715/227; 715/243; 382/276; 382/298

(58) Field of Classification Search .................. 715/838, 715/835, 764, 243, 212, 217, 227; 382/298, 382/276
See application file for complete search history.

(56) References Cited

U.S. PATENT DOCUMENTS

| | | | |
|---|---|---|---|
| 6,690,843 B1 * | 2/2004 | Squilla et al. ................. | 382/306 |
| 6,784,925 B1 * | 8/2004 | Tomat et al. ............ | 348/207.11 |
| 6,937,275 B2 | 8/2005 | Heiles | |
| 2002/0122067 A1 * | 9/2002 | Geigel et al. .................. | 345/788 |
| 2003/0063131 A1 * | 4/2003 | Ma ............................... | 345/838 |
| 2003/0167447 A1 * | 9/2003 | Hatta et al. .................... | 715/517 |
| 2004/0250205 A1 * | 12/2004 | Conning ....................... | 715/517 |
| 2005/0243105 A1 | 11/2005 | Fjeld et al. | |
| 2006/0053370 A1 * | 3/2006 | Hitaka et al. ................. | 715/517 |
| 2006/0125922 A1 | 6/2006 | Albert et al. | |
| 2006/0192791 A1 * | 8/2006 | Schick et al. ................. | 345/661 |
| 2006/0242567 A1 * | 10/2006 | Rowson et al. ............... | 715/517 |

OTHER PUBLICATIONS

Microsoft® Office Word 2003, copyright 2003, Screenshots 1-8.*
Contact Sheet—Pictures contact sheet editor Free contact sheet generator, http://contact-sheet.qarchive.org/, pp. 1-3, Mar. 19, 2007.
UC-AutoCam for USB Digital Cameras, UC-AutoCam Online Help Chapter 4—Contact Sheets, http://www.beausoft.com/uchelp/chapter4.htm, pp. 1-2, Mar. 19, 2007.

* cited by examiner

*Primary Examiner* — Ting Lee
(74) *Attorney, Agent, or Firm* — Fish & Richardson P.C.

(57) ABSTRACT

Implementing a digital contact sheet generator includes receiving input parameters from a remotely located user to create a table. The table includes one or more table cells, each of which comprises a text cell and an image cell. The input parameters define an appearance of the contact sheet and the table. Each table cell is formatted by selecting an image from a set of source media and calculating a size of the image cell associated with the particular table cell. A location of the image cell within the particular table cell is then determined and the image is resized. The image cell is repositioned and the resized image is drawn in the image cell.

23 Claims, 7 Drawing Sheets

CONTACT SHEET GENERATOR

CROSS-REFERENCE TO RELATED APPLICATION(S)

This application claims the benefit of priority of U.S. Provisional Patent Application 60/896,186, filed on Mar. 21, 2007.

BACKGROUND

Digital file management can include a wide range of processes such as capturing the digital files, processing the files and delivering the finished files. Many individuals with different roles may be involved in various aspects of the process. In addition, the individuals who are collaborating on a particular project often are in different geographical locations.

For example, in the context of a digital photo-shoot, the parties involved may include the photographer, the talent, the art director and the client. Each of those parties may be in a different geographical location, yet they may need to collaborate on certain aspects of the project. Thus, while the photographer may be at the site of the photo-shoot, the art director, whose input is required as the shoot proceeds, may be located far away in a different part of the world. In addition, the client may also be located far away from the photo-shoot but is needed to review and approve the photographs. Typically, the photographer had to create a contact sheet and then deliver it to the client which created delays in the client's ability to review the photographs.

U.S. Patent Publication No. 2007/0073776 and U.S. patent application Ser. No. 11/873,965, which are assigned to the assignee of this current application and are incorporated by reference, disclose an enterprise-level, digital asset management system that enables users to upload digital assets (e.g., digital files such as photographs) to a central on-line site and to view, edit, manage, arrange, organize, annotate and adjust the digital images. Multiple parties can communicate and collaborate with one another substantially in real-time in connection with a project involving the digital images. The images can be stored, archived, edited, sorted and sent using a central web-accessible workspace that can be accessed remotely by the various persons working on the project. Users (e.g., clients) can order post-production services such as file processing, direct print output, downloads to media, file transfers, file archiving and retrieval. The system can be fully automated to allow users to access their digital assets independently, as well as order and pay for services through a built-in ordering component. The system can consolidate various aspects of the digital photography workflow.

The present disclosure relates to additional features that can be incorporated into a digital asset management system. Alternatively, the additional features can be incorporated into a system separate from or independent from the digital asset management system.

SUMMARY

The details of one or more implementations of the invention are set forth in the accompanying drawings and the description below.

In one aspect, implementing a digital contact sheet generator includes receiving input parameters from a remotely located user to create a table. The table includes one or more table cells, each of which comprises a text cell and an image cell. The input parameters define an appearance of the contact sheet and the table. Each table cell is formatted by selecting an image from a set of source media and calculating a size of the image cell associated with the particular table cell. A location of the image cell within the particular table cell is then determined and the image is resized. The image cell is repositioned and the resized image is drawn in the image cell.

Other features and advantages will be apparent from the following description, the accompanying drawings, and the claims.

DETAILED DESCRIPTION

Figure 1:
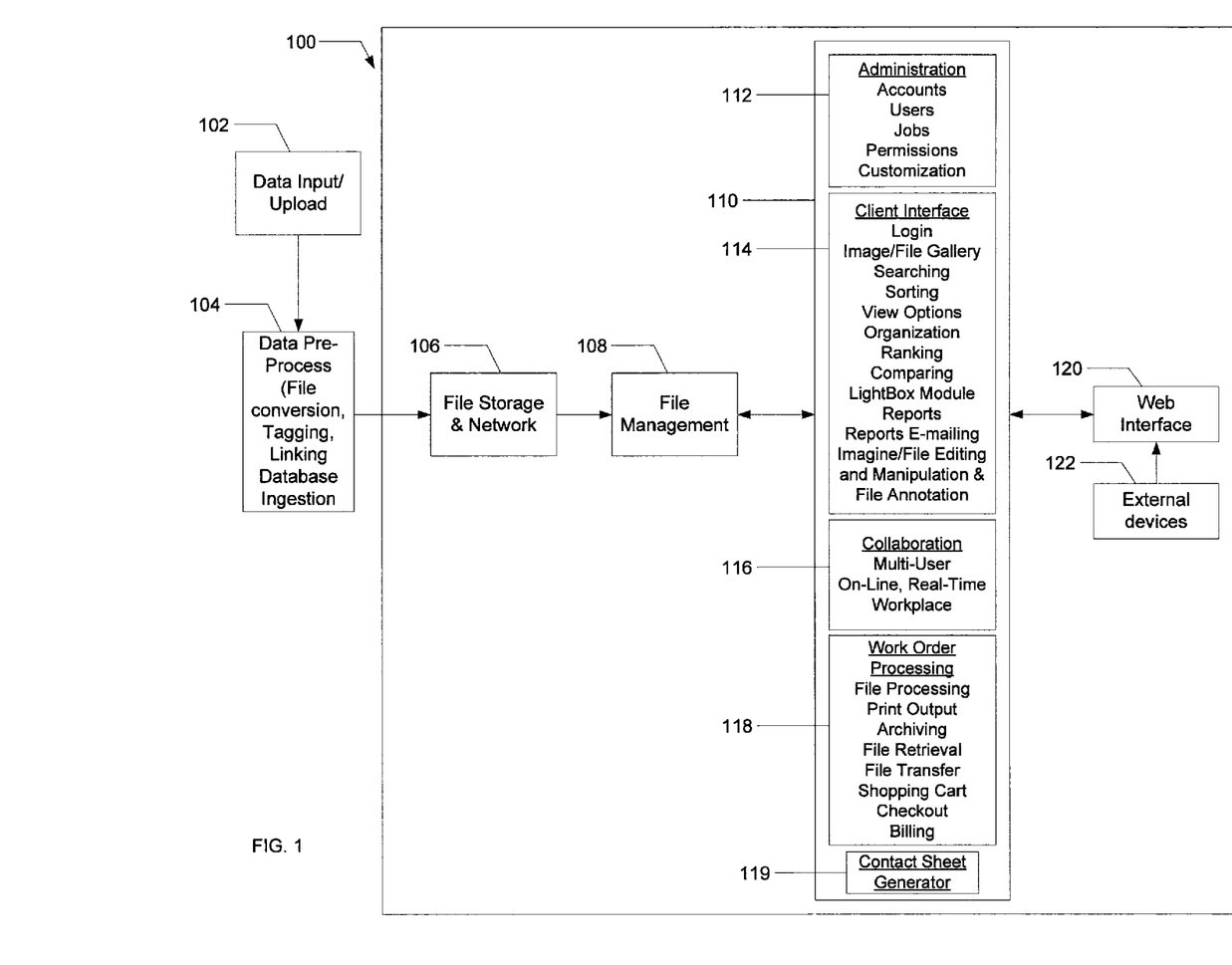
FIG. 1 is a block diagram illustrating an example of a digital asset management system.

FIG. 1 illustrates a block diagram of an implementation of a digital asset management system 100. The system includes various modules, each of which may be implemented in hardware, software or a combination of hardware and software, and may include, for example, one or more databases and servers. The various modules may be implemented separately or they may be integrated, depending on the particular needs of the system. Some features of the system can be implemented in computer programs executing on programmable computers. Each program can be implemented, for example, in a high level procedural or object-oriented programming language to communicate with a computer system. Furthermore, each such computer program can be stored on a storage medium, such as memory readable by a general or special purpose programmable computer or processor, for configuring and operating the computer when the storage medium is read by the computer to perform the functions described.

The system 100 includes a data input/upload module 102, which allows digital files to be uploaded to the system. Although the particular implementation described below focuses on digital image files such as digital photographs, various implementations may incorporate other types of digital files including, for example, data files, video files, audio files, application files and documents. In some implementations, the digital files can be uploaded directly to a file server. Other implementations may use a remote upload, for example, via the Internet or other network. A data pre-processing module 104 performs such processes as tagging the uploaded files with metadata and keywords, creating preview images from raw and high resolution image files, and linking the preview and high resolution files. The system includes a file storage and network module 106 as well as a file management module 108.

A main module 110 has several sub-modules that allow users to interact with the system. The main module 110 includes an administration sub-module 112, a client or user interface sub-module 114, a collaboration sub-module 116, a work order processing sub-module 118, and a contact sheet generator 119. The administration sub-module 112 allows an administrator to establish accounts, jobs and permitted activities for individual users. The client or user interface sub-module 114 allows a user to log into the on-line system, view image files stored in the system, search and sort image files, view options, rank or compare image files, store selected image files in separate folders, and edit and annotate image files, among other functions. The collaboration sub-module 116 allows multiple users of the system effectively to share an on-line workspace in real-time. The work order processing sub-module 118 allows a user to place selected image files in an electronic shopping cart and to place orders for prints of the selected files. The contact sheet generator sub-module 119 allows a user to select images files, select parameters to define the appearance of the contact sheet and generate a contact sheet. The contact sheet generator sub-module 119 is further described below. Additionally, the contact sheet generator sub-module 119 can be configured to be a separate module that is independent from the digital asset management system 100.

A web-interface module 120 allows users using external devices 124 (e.g., personal or laptop computers) to access the system 100 through a website on the Internet or other network. User applications residing on the external devices 124 may include, for example, an Internet browser, a file transfer protocol (FTP) client application, e-mail and a virtual private network (VPN) for approved client access.

Further details of the digital asset management system 100 are disclosed in U.S. Patent Publication No. 2007/0073776 and U.S. patent application Ser. No. 11/873,965, which are incorporated by reference.

Figure 2A:
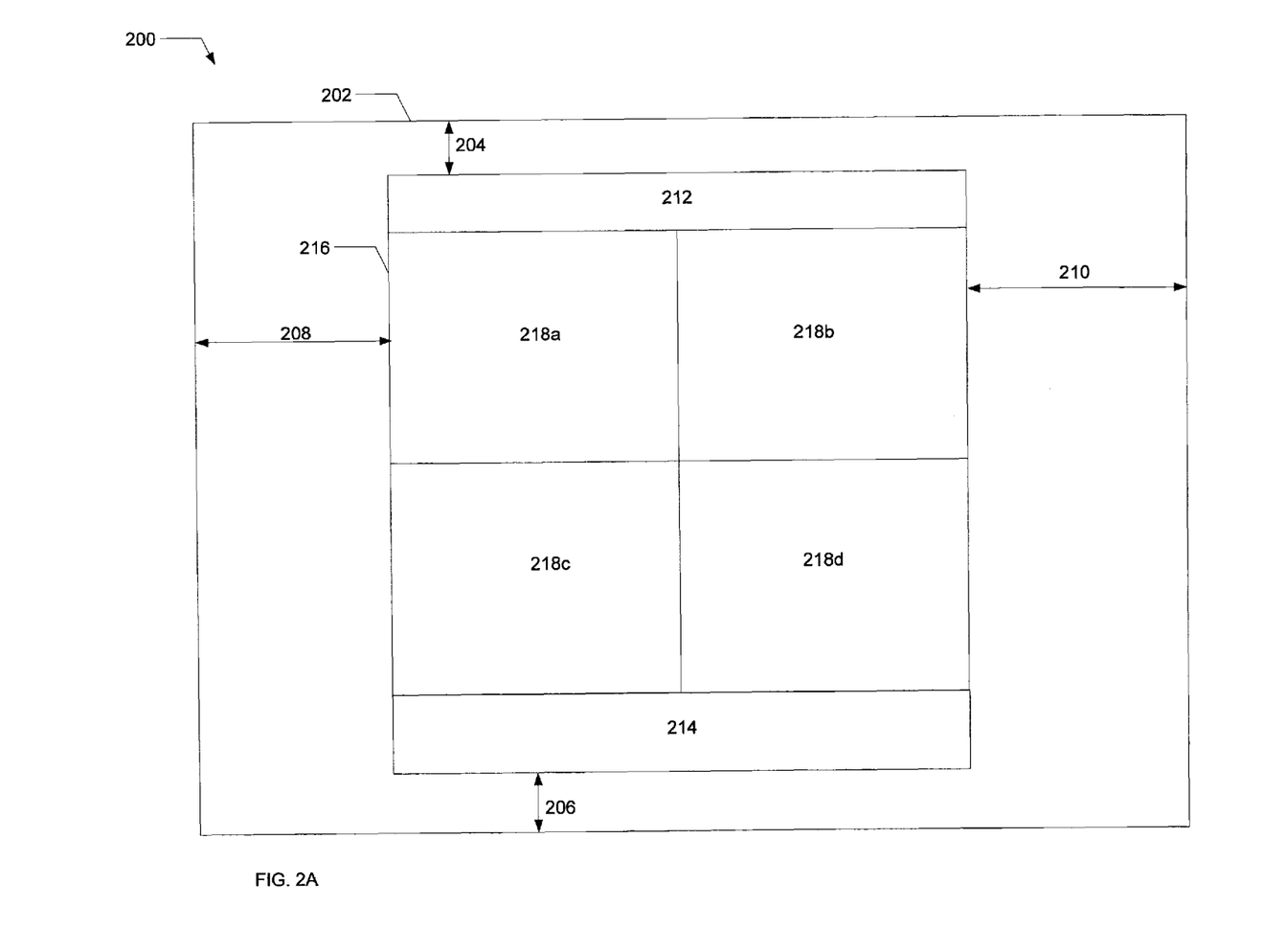
FIG. 2A is a block diagram illustrating an example contact sheet.

FIG. 2A is a block diagram illustrating an example contact sheet 200. Contact sheet 200 includes a sheet 202, a top margin 204, a bottom margin 206, a left margin 208, a right margin 210, a header 212, a footer 214, and a table 216. The sheet 202 can be any size or dimension. For example, the sheet 202 can have dimensions similar to a letter-sized piece of paper (i.e., 8.5×11 inches), a legal-sized piece of paper (i.e., 8.5×14 inches) or have a user-selected dimensions. The sheet 202 can be arranged in a portrait or landscape orientation.

The top margin 204 is the distance from the top edge of the sheet 202 to the top edge of the header 212. The bottom margin 206 is the distance from the bottom edge of the sheet 202 to the bottom edge of the footer 214. The left margin 208 is the distance from the left edge of the sheet 202 to the left edge of the table 216. The right margin 210 is the distance from the right edge of the sheet 202 to the right edge of the table 216.

The header 212 is an area located near the top of the sheet 202 and can contain text and/or images. For example, the header 212 can include a name, the date of a photo-shoot, a logo, a page number, job information, custom user input or some other identifying information. In other implementations, the header 212 can be dynamic and can be populated by metadata. The footer 214 is an area located near the bottom of the sheet 202. Like the header 212, the footer 214 can include text and/or images. In other implementations, the footer 214 can be dynamic and have its contents populated by metadata. The contents of the header 212 and the footer 214 can be selected by the user, by metadata or can be determined by the photographer or by metadata. The size of the header 212 and the footer 214 can be determined by the user or can be defined dynamically by the amount of text or the size of the image to be placed in the header 212 or the footer 214.

The table 216 includes one or more table cells 218. The table cells 218a, 218b, 218c and 218d are arranged in a grid formation. As shown in FIG. 2A, table 216 is arranged in a 2×2 formation. The table cells 218 can be configured to be in any X×Y formation, where X and Y are positive integers. For example, a table 216 can be formatted such that the table cells 218 are arranged in a 3×3 or a 2×6 formation. The width and height of the table 216 is based on the size of the sheet 202, the sizes of the header 212 and the footer 214 and the sizes of the top margin 204, the bottom margin 206, the left margin 208 and the right margin 210.

Figure 2B:
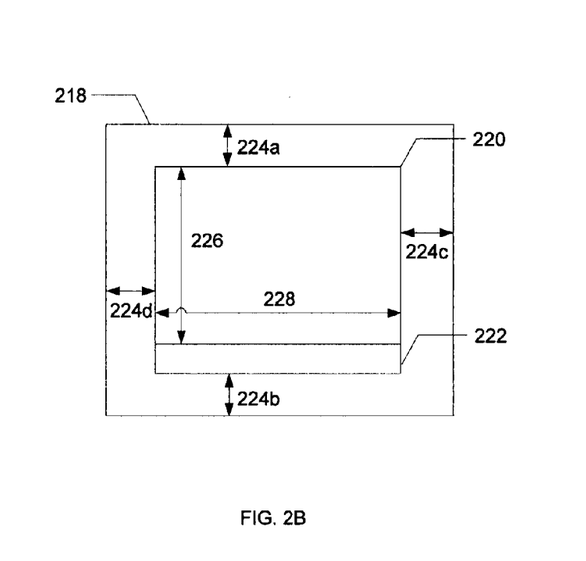
FIG. 2B is a block diagram illustrating an example table cell.

FIG. 2B illustrates an example table cell 218. The table cell 218 includes an image cell 220, a text cell 222, and cell padding 224a, 224b, 224c and 224d (collectively cell padding 224). The image cell 220 contains a digital photograph or some other digital image. Each image cell 220 is associated with an image cell height 226 and an image cell width 228.

The text cell 222 contains text describing or identifying the photograph in the image cell 220. For example, the text cell 222 can contain the file name of the digital photograph or a photograph number associated with the digital photograph (e.g., "photo 1 of 200"). In other implementations, the text cell 222 can be dynamic and the contents of the text cell 222 can be populated by metadata.

Figure 2C:
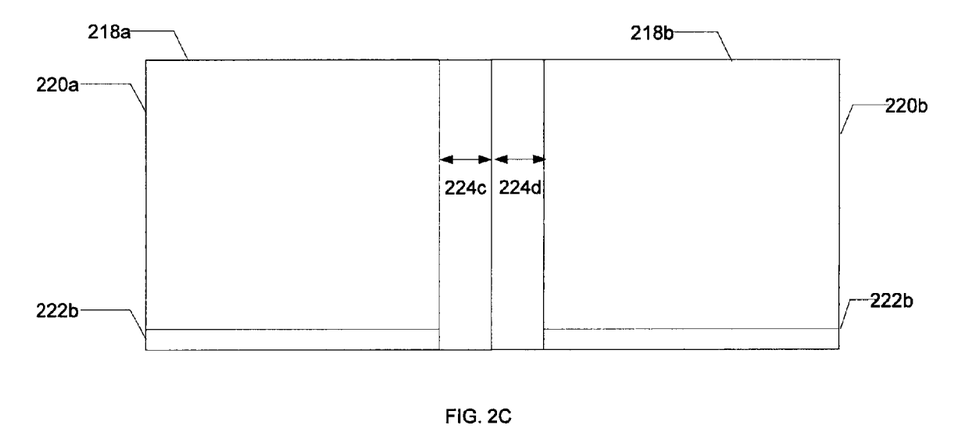
FIG. 2C is an illustration of an example row of a table.

The table cell 218 also includes cell padding 224, which can serve as a buffer between the boundaries of the table cell 218 and the image cell 220 and/or the text cell 224. The table cell 218 can have any combination of cell padding 224a-d or can have no cell padding 224. For example, the table cell 218 shown in FIG. 2B illustrates a table cell 218 with cell padding 224a-d arranged around all four edges of the table cell 218. Alternatively, the table cell 218 can have some other combination of cell padding 224a-d. For example, in some implementations, table cell 218 may only have cell padding 224 located at edges of the table cell that are horizontally adjacent to another table cell, as shown in FIG. 2C. FIG. 2C shows a first table cell 218a with cell padding 224c and table cell 218b with a second cell padding 224d which correspond to the edges of the table cells that are horizontally adjacent another table cell. In other implementations, the table cell 218 can only have cell padding 224 located adjacent each edge of the table cell 218 that is vertically adjacent another table cell.

Figure 2D:
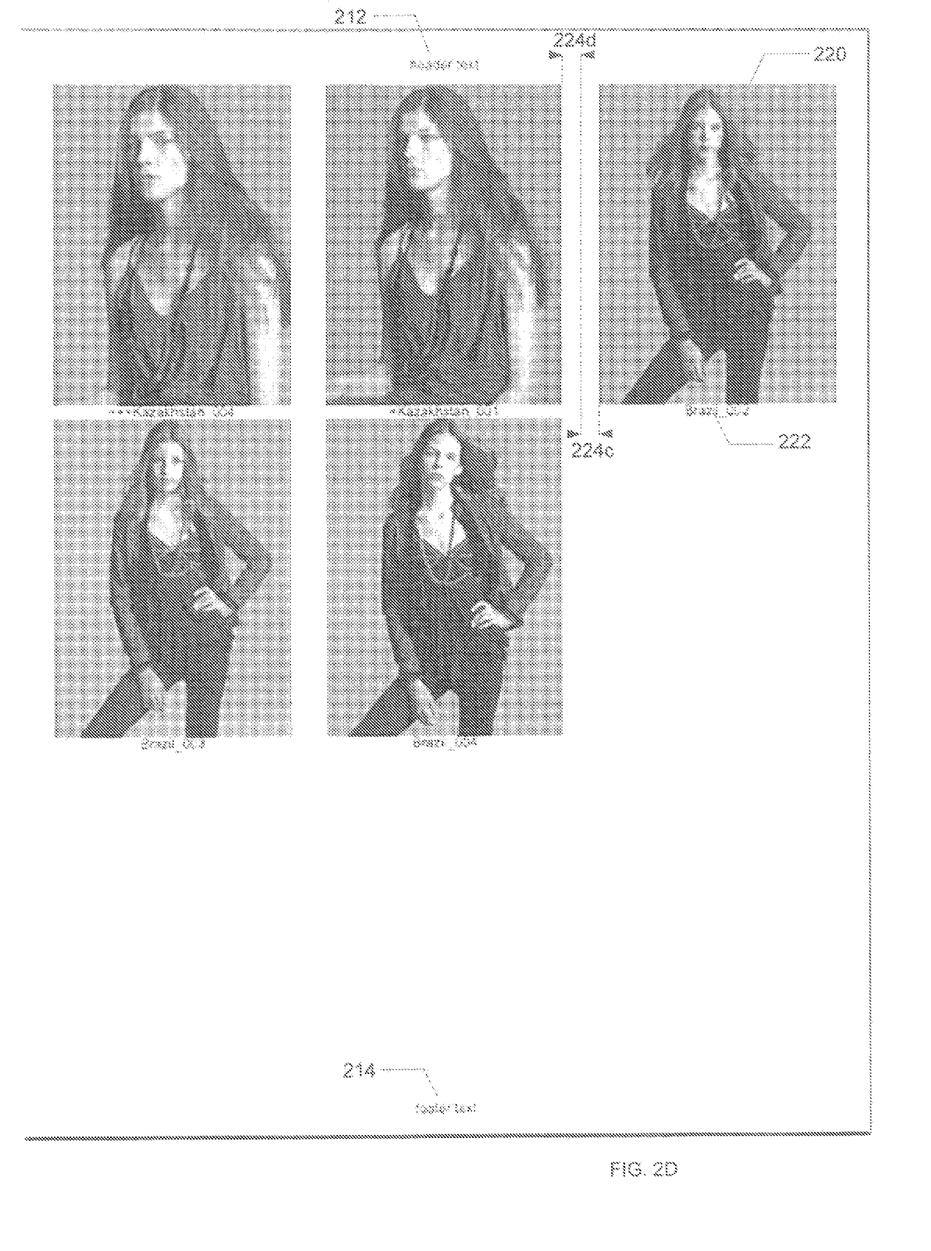
FIG. 2D is an example contact sheet.

FIG. 2D illustrates an example of a contact sheet where the table 216 is arranged in a 2×3 table with cell padding 224c and cell padding 224d located between table cells that are horizontally adjacent to another table cell.

Figure 3:
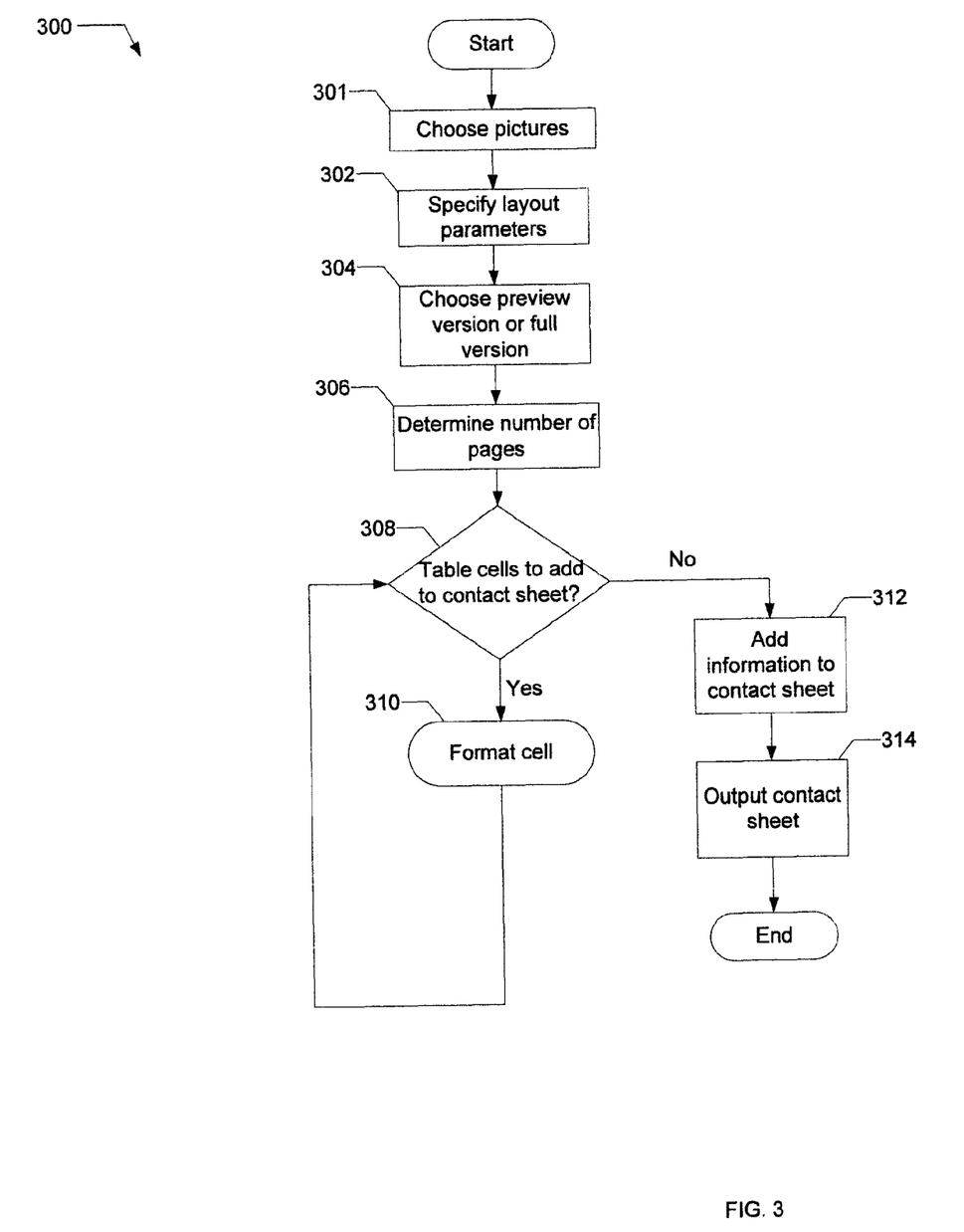
FIG. 3 is a flowchart illustrating an example process to create a contact sheet.

FIG. 3 is a flowchart illustrating a process 300 to create digital contact sheets 200 (e.g., contact sheets 200 in PDF format) remotely. Process 300 can be implemented by the contact sheet generator 119 of the digital asset management system 100. Process 300 and/or the contact sheet generator 119 can leverage commercially available software or tools to generate the digital contact sheets 200. For example, process 300 may use ABCpdf™ .NET 5.0 and different features of the ABCpdf™ .NET 5.0 tool such as the PDFTable class to create the Adobe™ PDF format contact sheets 200.

Process 300 begins when a user, typically a client who is not present at the photographer's studio or at the photo-shoot location, accesses a remote database through the Internet using a digital asset management system 100. The user then selects digital pictures from a source directory (block 301). The user can select all the available digital pictures or some subset of the digital pictures to be included in the digital contact sheet 200. For example, the user may select all of the digital images taken at a particular photo-shoot or may select digital images associated with a particular model or fashion designer.

The user then specifies layout parameters for the contact sheets 200 (block 302). The layout parameters define the appearance of the contact sheets 200. The layout parameters include, but are not limited to: print layout (e.g., portrait or landscape); header, footer, and image caption information; text positioning and style or font; table layout (e.g., 2×2, 3×3, 2×3); contact sheet background; image border; font color; image border weight (i.e., thickness of the border); and document International Color Consortium (ICC) color space. The layout parameters allow the user to customize the appearance of the contact sheet 200. For example, the user can specify that each contact sheet 200 should have a portrait orientation, have a table 216 arranged in a 3×3 formation with the date of the photo-shoot and the client's name and logo in the header 212. In addition to defining the appearance of the digital contact sheets 200, the user can choose a parameter that embeds XML information into the generated contact sheet 200.

After the layout parameters are selected, the user chooses to generate a preview contact sheet or a full contact sheet 200 (block 304). The preview contact sheet contains a subset of the digital pictures the user selected. The subset can be randomly selected, selected by the user, or can be selected in some other method. For example, the preview contact sheet may be one page of images having a portrait orientation and one page of images having a landscape orientation. The full contact sheet contains the full set of digital photographs selected by the user.

Process 300 then determines the number of pages that needs to be generated (block 306). Process 300 can calculate the number of pages based on the number of pictures selected and the layout parameter specifying the table formation. For example, if twenty-five pictures were selected and the user specified a 3×3 table, process 300 would determine that three pages would be needed (i.e., the first two pages each contain nine images and the third sheet would contain seven images).

Figure 4:
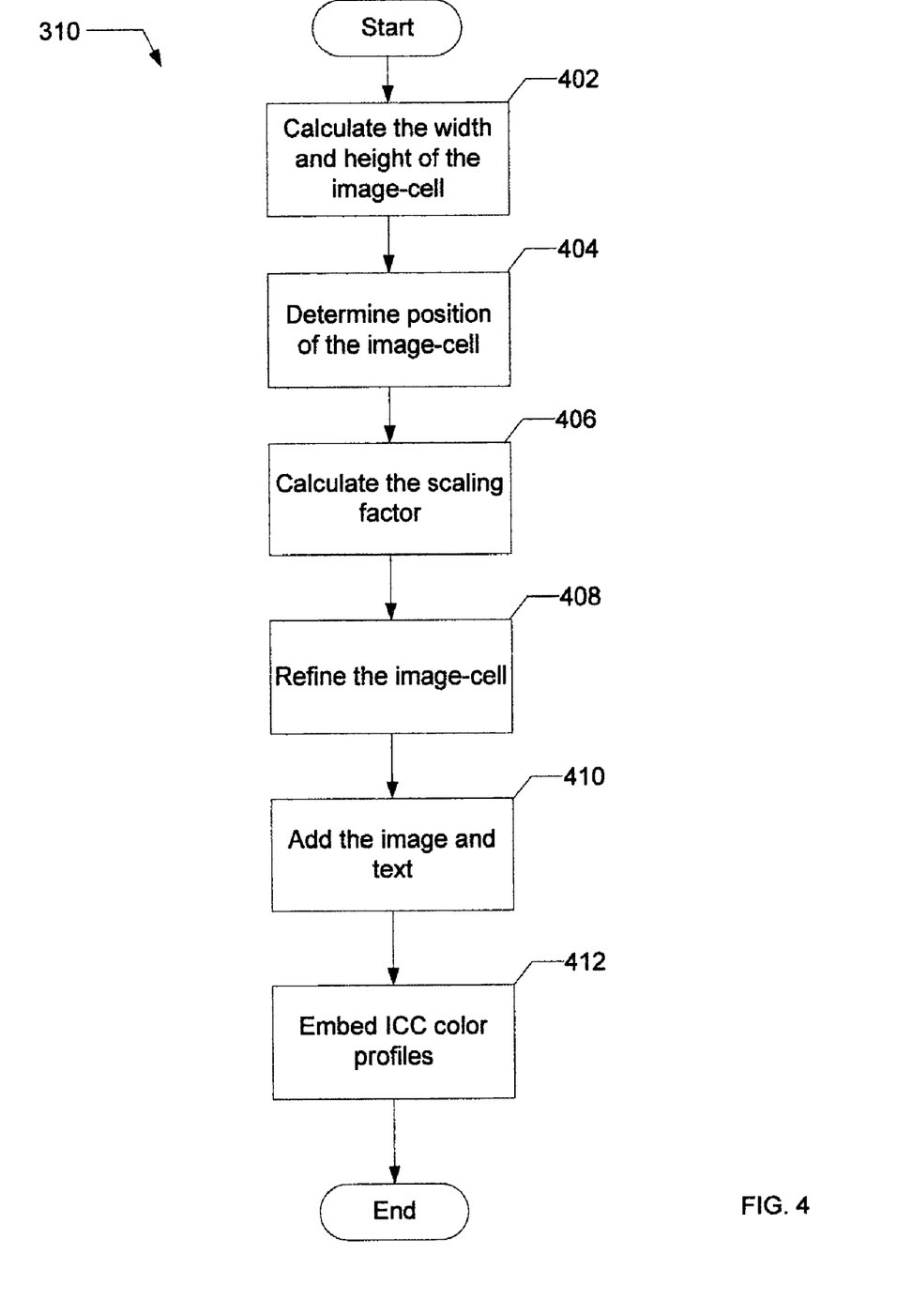
FIG. 4 is a flowchart illustrating an example process to format a table cell.

After the number of pages is calculated, process 300 determines if there are digital photographs that have to be added to the contact sheet 200 (block 308). If there are digital photographs to be added to the contact sheet, then process 300 formats a table cell 218 to be associated with the digital image (block 310). FIG. 4 is a flowchart illustrating a process 310 to format a table cell 218.

Process 310 begins by determining the image cell height 226 and the image cell width 228 (block 402). The image cell height 226 can be determined based on the number of rows in the table 216, the sizes of the top margin 204, the bottom margin 206, the left margin 208 and the right margin 210 and the height of the contact sheet 200. The image cell width 228 can be determined based on the width of the contact sheet 200, the size of the right margin 210, the size of the left margin 208, and the number of columns in the table 218.

Process 310 then determines the position of the image cell 220 within the table cell 218 (block 404). In some implementations, process 310 determines the position of the image cell 220 based on the location of the table cell 218 (i.e., the row and column of the table cell 218), the top margin 204, the bottom margin 206, the size of the contact sheet 200, and the image cell height 226 and image cell width 228.

Then process 310 calculates a scaling factor (block 406). The scaling factor is used to preserve the aspect ratio of the digital image (i.e., the height to width ratio of the image) when it is drawn in the image cell 220. In some implementations, process 310 determines the scaling factor based on the dimensions of the digital image, the width of the table cell 218, the height of the table cell 218, and the cell padding 224 associated with the table cell 218.

After the scaling factor is determined, the image cell 220 is repositioned to allow it to contain the scaled digital image (block 408). This also allows the image cell 220 to be placed in the correct position (e.g., an aesthetically pleasing position) within the table cell 218. In some implementations, the image cell 220 is repositioned by centering the image cell 220 within the table cell 218. Once the image cell 220 is repositioned, process 310 then draws the digital image in the image cell 220 (block 410). In some implementations, process 310 uses the table.addimage( ) function of the ABCpdf™ .NET tool. In addition to drawing the image in the image cell 220, text associated with the digital image is placed in the text cell 222 (block 410). In some implementations, the process 310 uses the addtext( ) function of the ABCpdf™.NET tool. The text can be identifying information such as the digital photograph's file name. In some implementations, the text can be determined dynamically and the contents of the text cell 222 is determined by metadata.

After the image cell 220 and the text cell 222 are drawn, process 310 digitally embeds the color information associated with the digital image into the contact sheet 200. For example, process 310 may determine the ICC color profile matching the source image and embed the color profile into the contact sheet 200. The color profile can be embedded into the contact sheet 200 by using metadata or some other method to digitally embed the information. The embedded color information is associated with the table cell containing the digital image.

Further mathematical details of an example process 310 are disclosed in U.S. Provisional Patent Application 60/896, 186, filed on Mar. 21, 2007 which is incorporated herein by reference.

Returning to FIG. 3, process 300 continues to format table cells 218 (block 310) until all of the digital photographs are added to the contact sheet 200.

After all the digital photographs are added to the contact sheet, process 300 updates the contact sheets 200 with any header or footer information that the user specified in the layout parameters (block 312). In other implementations, process 300 updates the header and the footer using metadata to populate the contents of the header and the footer. The header or footer information may include text and/or images, such as a client's name and logo. Additionally, if there are multiple pages of contact sheets 200, page numbers can be added to the contact sheet 200 (block 312). Then process 300 generates the digital contact sheet 200 (block 314). The digital contact sheet 200 can be in PDF format or some other digital format.

Figure 5:
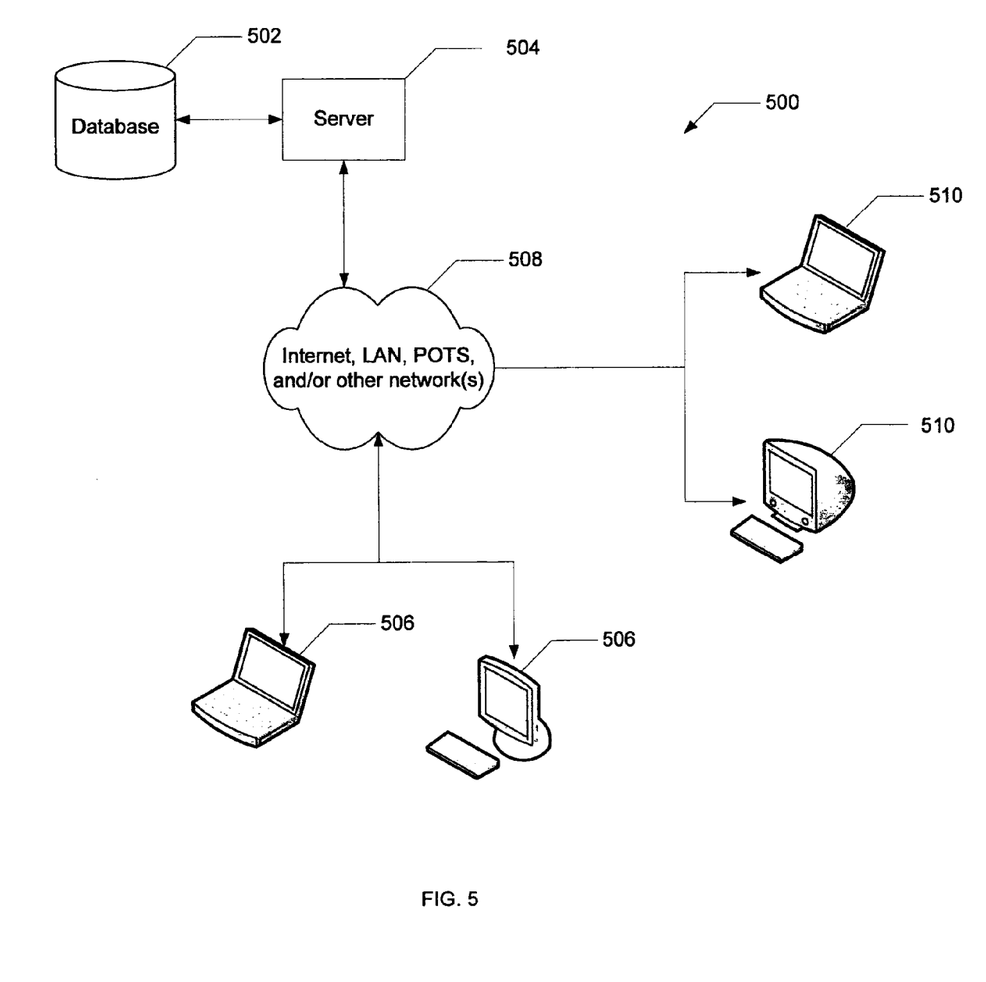
FIG. 5 is a block diagram of an example system implementing an online contact sheet generator.

FIG. 5 illustrates an example system that can be used to implement an online contact sheet generator 500. The example online contact sheet generator 500 includes one or more databases 502 connected to a server 504. The server 504 can be, but is not limited to, any type of dedicated server or personal computer. The database 502 can be contained within the server 504 or can be in a separate storage device or computer.

The server 504 exchanges data with computing devices 506 located, for example, at a photographer's office/studio or at the photo-shoot site via a connection to a communication network 508. The network connection can be any type of network connection, such as an Ethernet connection, digital subscriber line (DSL), telephone line or coaxial cable. The communication network 510 can be any type of network, such as the Internet, a telephone network, a cable network, and/or a wireless network. The computing devices 506 can be any type of computing device. For example, the computing device 506 can be a personal computer, a laptop or a personal digital assistant ("PDA"). The communication network 508 transmits information from the server 504 to the computing devices 506. Additionally, the communication network 508 transmits information, such as digital photographs, from the computing devices 506 to the server 504.

The communication network 508 also is connected to computing devices 510 located at the client's offices or workplace. Like the computing devices 506 located at the photographer's office/studio, the computing devices 510 can be any type of computing device. The computing network 508 can receive/transmit data from the server 504 and the database 502 with the computing devices 510 at the client's offices and allows the client to generate contact sheets.

A number of implementations of the invention have been described. Nevertheless, it will be understood that various modifications may be made without departing from the spirit and scope of the invention. For example, process 300 may create digital contact sheets 200 in a Microsoft PowerPoint format. Accordingly, other implementations are within the scope of the claims.

What is claimed is:

1. A machine-implemented method for generating a digital contact sheet from a set of source media, the method comprising:
   receiving input parameters from a remotely located user to create a table comprising one or more table cells, each of which comprises a text cell and an image cell, wherein the input parameters comprise layout parameters that define an appearance of the contact sheet and the table, wherein the layout parameters include a header dimension, a footer dimension, text font, image border weight and a user defined row and column configuration; and
   formatting each table cell, wherein formatting a particular table cell comprises:
      selecting an image from the set of source media;
      calculating a size of the image cell associated with the particular table cell;
      determining a location of the image cell within the particular table cell,
      resizing the image;
      repositioning the image cell, wherein repositioning the image cell comprises using the image cell's dimensions and the image's dimensions to adjust the location of the image cell within the table cell; and
      drawing the resized image in the image cell.

2. The method of claim 1 wherein calculating a size of the image cell associated with the particular cell comprises:
   calculating a height and width of the image cell based on the received input parameters.

3. The method of claim 1 wherein resizing the image comprises:
   determining a resize-ratio based on dimensions of the image, the received input parameters and the size of the particular table cell; and
   calculating the image cell's dimensions.

4. The method of claim 1 further comprising:
   determining a color profile for each image after drawing the resized image in the image cell; and
   associating the color profile for each image with the particular table cell.

5. The method of claim 4 wherein the color profile is an International Color Composite color profile.

6. The method of claim 4 wherein associating the color profile with the table cell comprises embedding metadata into the contact sheet.

7. The method of claim 1 further comprising:
   adding text to the text cell associated with each particular table cell; and
   adding sheet information comprising header information, footer information and a page number.

8. The method of claim 7 wherein the text in the text cell, the header information and the footer information are dynamic.

9. The method of claim 8 wherein the text in the text cell, the header information and the footer information are populated using metadata.

10. The method of claim 8 wherein the text in the text cell, the header information and the footer information are populated by custom user input.

11. The method of claim 8 wherein the text in the text cell, the header information and the footer information are populated by identifying information.

12. The method of claim 1 wherein each of the table cells further comprise cell padding separating at least one boundary of the table cell and the text cell or the image cell.

13. The method of claim 1 wherein the layout parameters further include a contact sheet background and a color space.

14. An article comprising a machine-readable medium storing machine-readable instructions that, when applied to the machine, cause the machine to:
   receive input parameters from a remotely located user to create a table comprising one or more table cells, each of which comprises a text cell and an image cell, wherein the received input parameters comprise layout parameters that define an appearance of a contact sheet and the table, wherein the layout parameters include a header dimension, a footer dimension, text font, image border weight and a user defined row and column configuration; and
   format each table cell, wherein formatting a particular table cell comprises:
      selecting an image from the set of source media;
      calculating a size of the image cell associated with the particular table cell;
      determining a location of the image cell within the particular table cell,
      resizing the image;
      repositioning the image cell, wherein repositioning the image cell comprises using the image cell's dimensions and the image's dimensions to adjust the location of the image cell within the table cell; and
      drawing the resized image in the image cell.

15. The article of claim 14 further including instructions that, when applied to the machine, cause the machine to calculate a height and width of the image cell based on the received input parameters.

16. The article of claim 14 further including instructions that, when applied to the machine, cause the machine to:
   determine a resize ratio based on dimensions of the image, the received input parameters and the size of the particular table cell; and
   calculate the image cell's dimensions.

17. The article of claim 14 further including instructions that, when applied to the machine, cause the machine to:
   determine a color profile for each image after drawing the resized image in the image cell; and
   associate the color profile for each image with the particular table cell.

18. The article of claim 17 further including instructions that, when applied to the machine, cause the machine to embed metadata into the contact sheet to associate the color profile for each image with the particular table cell.

19. The article of claim 14 further including instructions that, when applied to the machine, cause the machine to:
   add text in the text cell associated with each particular cell; and add sheet information wherein sheet information comprises header information, footer information and a page number.

20. A system to generate a digital contact sheet comprising:

a communications network;

a server coupled to the network;

a remote computing device coupled to the server through the communications network, wherein the server is configured to:

receive input parameters from the remote computing device to create a table comprising one or more table cells, each of which comprises a text cell and an image cell, wherein the received input parameters comprise layout parameters that define an appearance of the contact sheet and the table, wherein the layout parameters include a header dimension, a footer dimension, text font, image border weight and a user defined row and column configuration; and format each table cell in response to receiving the input parameters, wherein formatting a particular table cell comprises:

selecting an image from the set of source media;

calculating a size of the image cell associated with the particular table cell;

determining a location of the image cell within the particular table cell, resizing the image;

repositioning the image cell, wherein repositioning the image cell comprises using the image cell's dimensions and the image's dimensions to adjust the location of the image cell within the table cell; and drawing the resized image in the image cell.

21. The system of claim 20 wherein the server is configured to:

determine a resize-ratio based on dimensions of the image, the received input parameters and the size of the particular table cell; and calculate the image cell's dimensions.

22. The system of claim 20 wherein the server is configured to:

determine a color profile for each image after drawing the resized image in the image cell; and associate the color profile for each image with the particular table cell.

23. The system of claim 20 wherein the server is configured to:

add text in the text cell associated with each particular cell; and add sheet information wherein sheet information comprises header information, footer information and a page number.

* * * * *